United States Patent [19]

Carlson

[11] 4,347,461
[45] Aug. 31, 1982

[54] INCIDENT ILLUMINATION RESPONSIVE LIGHT CONTROL

[75] Inventor: Randolph S. Carlson, Irvine, Calif.
[73] Assignee: Robert L. Elving, Anaheim, Calif.
[21] Appl. No.: 199,825
[22] Filed: Oct. 23, 1980
[51] Int. Cl.³ ............................................. H05B 37/02
[52] U.S. Cl. ...................................... 315/158; 315/308
[58] Field of Search ................................. 315/158, 308

[56] References Cited

U.S. PATENT DOCUMENTS 4,009,387  2/1977  Nuver ................................... 315/158
4,236,101 11/1980  Luchaco .............................. 315/158
4,273,999  6/1981  Pierpoint ............................. 315/158

*Primary Examiner*—Harold A. Dixon
*Attorney, Agent, or Firm*—Knobbe, Martens, Olson, Hubbard & Bear

[57] ABSTRACT

A circuit for controlling the power supplied to a lamp includes a sensor, located at the lamp, which measures the portion of the lamp's output which is reflected from an illuminated area. This sensor is connected to a sensing circuit which measures the reflectance of the illuminated area. Using this reflectance measurement, the total illumination incident on a work space, both from the light source and from other illumination sources, is determined and this total incident illumination is adjusted by adjusting the power supplied to the light source to provide a controlled illumination. The ability to measure reflectance of the illuminated area using a sensor at the light source itself permits the manufacture of a light source which will self-adjust to illuminate a work area at a desired incident illumination level, without adjustment of the light after installation, and without a requirement that the light source be adjusted if the reflectance of the work area changes.

14 Claims, 4 Drawing Figures

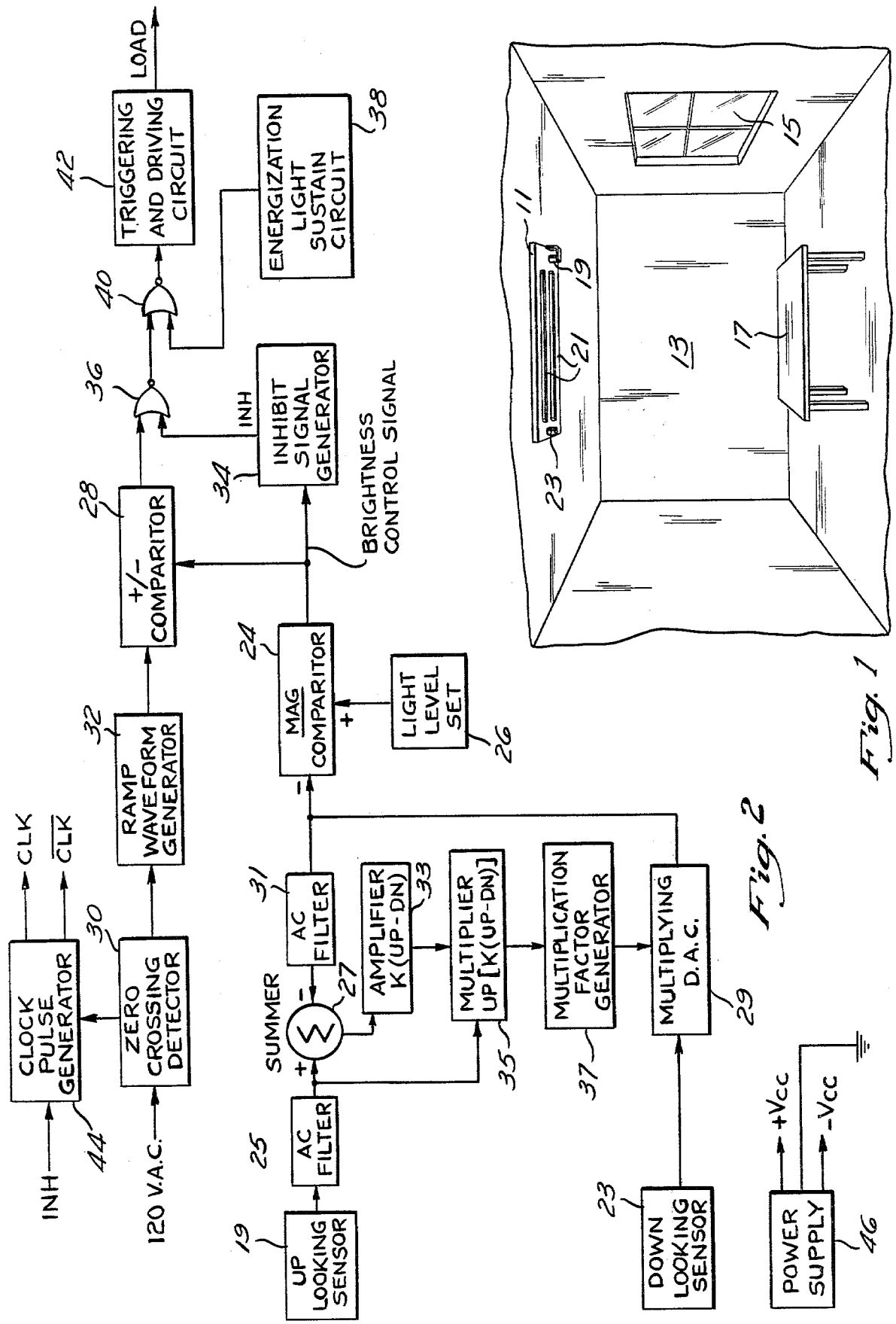

INCIDENT ILLUMINATION RESPONSIVE LIGHT CONTROL

BACKGROUND OF THE INVENTION

The present invention relates to circuits for controlling the power supplied to a light source to maintain the intensity of illumination in a given location at a predetermined level. More specifically, the invention relates to a circuit for compensating for variable reflectance of an illuminated area.

As is well known, different tasks to be undertaken in different working environments require different illumination levels. If illumination levels fall below the desired level, the safety and efficiency of personnel suffers. If illumination levels are raises significantly above these desired levels, energy usage increases. In fact, many municipalities have law which prohibit over-illumination of work areas in order to conserve valuable energy resources.

Prior to the present invention, there were three known techniques available for adjusting light levels to provide adequate, but not superfluous lighting. The first of these approaches involves the installation of lighting which is certain to be adequate enough to meet the minimum lighting level, the subsequent measurement of the incident illumination in the lighted area through the placement of a photosensitive device at the working surface, and the subsequent adjustment of the power supplied to the lighting element while monitoring the photosensitive device to provide the correct lighting level.

More often, a compromise is merely made in the selection of lighting fixtures in a room which is sure to provide adequate lighting, a practice which often overlights an area and wastes energy.

Even in those installations where a careful adjustment is made of the lighting level, using a photometer, the lighting level must be set assuming no natural light is available, so that the work space is usable on cloudy days or during times of darkness. Under such circumstances, when natural light adds to the illumination level, energy is often wasted.

The second obvious technique for maintaining proper incident illumination levels is the placement of a photosensitive device at the work surface, directed at the source of lighting. Such a photosensor can be used to control the power supplied to the lighting source and will adequately compensate for changes in natural illumination levels. The installation of such a system, however, involves added expense in terms of wiring remote photosensors to the source of light. In addition, the photosensors are necessarily located where they can be inadvertently covered by items on the work surface or can become dirty, both situations leading to a false indication of inadequate lighting and a resultant over-lighting of the work area.

An additional prior art technique is the placement of a photocell, or other light sensitive device, on a light fixture, directed toward the area to be illuminated. Such a device will, of course, control the light source and compensate for changes in the natural illumination level within the lighted area. Once installed in a work area, these devices can be adjusted so that a fairly constant level of illumination can be provided. However, if the reflectance of the work area is altered, a false indication of illumination falling on the work surface will be provided by the system and the lights will be improperly adjusted. Thus, for example, if lights are installed with such a photosensor, in a work area which includes relatively dark furniture and floors, and the furniture or floors are later changed to a lighter color, or even in the instance where a large sheet of paper is placed on a desk, these changes in work area reflectance will be interpreted as an increase in the illumination level, even though no such increase has occurred. The system will thus respond by lowering the illumination level, possibly below that which is satisfactory for the work to be performed. Alternatively, if the lights are initially adjusted for a work area which is fairly light or reflective, and furnishings are later added which have a low reflectance, the lighting will be automatically increased, resulting in unnecessarily high levels of illumination.

SUMMARY OF THE INVENTION

The present invention provides a circuit and photosensor combination which may be mounted at or adjacent a lighting fixture and which measures the instantaneous reflectance of the illuminated area. This reflectance value is utilized in a power control circuit to modify the illumination output of the light source in a manner which maintains the combination of natural and artificial illumination incident at the work area at a constant level.

A light sensitive device mounted on or adjacent to the artificial light source is aimed at this light source and provides an output signal related to the intensity of light output from that source. In the preferred embodiment, the light source is a fluorescent element which produces a cyclically varying light output at the applied power frequency. A second light sensitive device, mounted at or adjacent to the light source, is aimed away from the artificial light source, and measures the total intensity of the natural and artificial light reflected from the illuminated area. The alternating current component of the signal from this second sensor is filtered from the sensor output signal and relates to that portion of light measured at the second sensor which originated at the controlled artificial light source. Comparison of the AC component of the second sensor with the output signal from the first sensor provides a measure of room reflectance.

The total output of the second sensor, including bothh the AC and DC component is modified by the measured room reflectance value to accurately adjust the artificial light source to produce the desired incident illumination level at the work surface.

This system may thus be factory adjusted to provide a predetermined illumination level. Once installed, the circuit will automatically control the artificial light source to automatically control the combination of natural and artificial light actually falling on the work surface to maintain a predetermined lighting level. If the reflectance of the working area is changed, the lighting level will remain unchanged, since the circuit will automatically compensate for such reflectance changes, even though the second photosensor, which measures room illumination, will generate a higher or lower signal under these circumstances.

The invention also provides a circuit which forces the artificial lights to remain on for a short period of time when they are initially energized by the operation of a switch. This is done so that the light control signal may be modified by the light sensing devices to compensate for any changes in room reflectance which may have occurred during the absence of artificial light operation.

The invention thus provides a means whereby natural and artificial light are differentiated so that a direct measurement of room reflectance can be made at or near the lighting source. Because of this differentiation ability, the present invention does not require prior measurement or calculations of room reflectance or inconvenient measurement of illumination levels using photosensors at the work surface.

In addition to providing means for more accurately controlling interior room lights and maintaining them at a level which will produce desired incident illumination levels at the work surface, this invention compensates for changes in natural light levels as well as changes in area reflectance so that desired lighting levels are maintained at all times, avoiding the prior art problems of undesirable working conditions, excess lighting energy usage due to higher than desired lighting levels, or inconvenient and costly installation of easily covered working surface sensors.

DESCRIPTION OF THE DRAWINGS

These and other advantages of the present invention are best understood by reference to the drawings in which:

FIG. 1 is an illustrative perspective view of an illuminated work area and an artificial illumination source which may be controlled in accordance with the present invention;

FIG. 2 is a schematic block diagram of the incident illumination responsive light control of the present invention;

DETAILED DESCRIPTION OF THE PREFERRED EMBODIMENT

Figure 3:
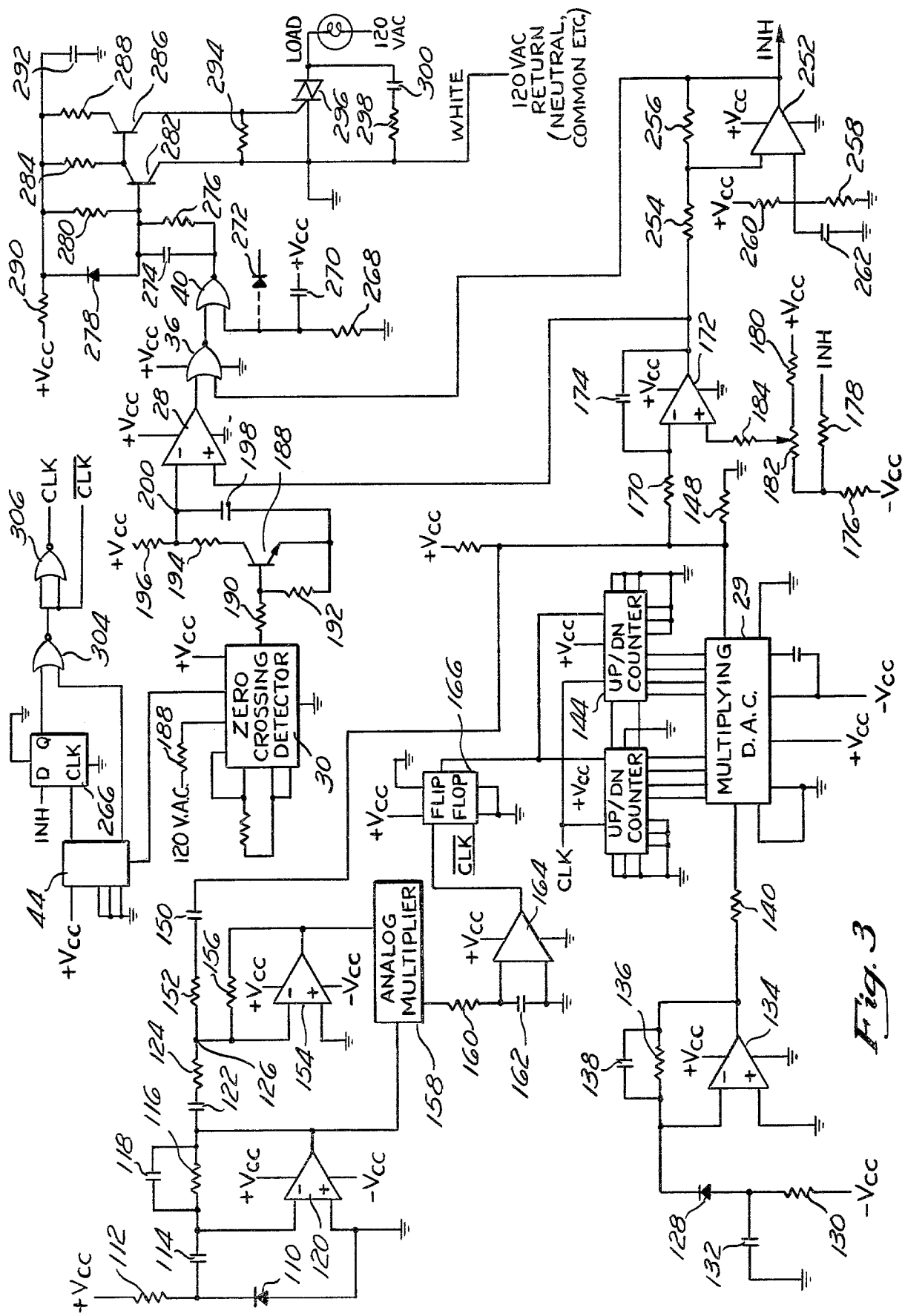
FIG. 3 is a detailed schematic circuit diagram of the illumination light control of FIG. 2.

Referring initially to FIG. 1, the illumination control circuit of the present invention is mounted in a typical embodiment within a luminaire 11, typically mounted on the ceiling of an area 13 to be illuminated. The area 13 will typically include a source of natural illumination, such as the window 15, and the circuit of the present invention is designed to control the incident illumination level at a work surface, such as a table 17. This is accomplished by monitoring the output signal level from an up-looking photosensor 19 aimed directly at the source of artificial light, in this case, fluorescent tubes 21, and a down-looking light sensor 23 aimed at the illuminated area 13. The purpose of the control circuit, to be described below, is to maintain the incident illumination at the work surface 17 at a constant predetermined level regardless of the reflectance of the area 13 and work surface 17, and regardless of the amount of natural illumination entering the area 13 through the window 15.

FIG. 2 shows that the up-looking sensor 19, which monitors the intensity of light output from the luminaire 11 is connected through an AC filter 25 to a summer 27. The output signal from the down-looking sensor 23 is proportioned in a multiplying digital-to-analog convertor 29 and filtered in an AC filter 31 for application to the summer 27. The filters 25 and 31 remove the DC component of the output signal from the up-looking sensor 19 and down-looking sensor 23 so that the summer 27 effectively compares only the AC component, that is, only that portion of the sensor signals which results from illumination generated by the illuminaire 11. The difference signal from the summer 27 is amplified by fixed gain amplifier 33 and multiplied by the output signal of the AC filter 25 in a multiplier 35 to generate a correlation function.

This function produced by the multiplier 35 is supplied to a multiplication factor generator 37 which provides corrected input multiplication factors to the multiplying digital-to-analog convertor 29 to achieve a null output from the multiplier 35. If the signal generated by the multiplier 35 is positive, the multiplication factor generator 37 increases the multiplication factor magnitude in the digital-to-analog converter 29 to increase the output of the AC filter 31. Conversely, if the multiplier 35 generates a negative output signal, the multiplication factor generator 37 reduces the magnitude of the multiplication factor in the digital-to-analog convertor 29. The gains within the system are set so that, at a reflectance value of unity, the multiplying digital-to-analog convertor 29 is at approximately the mid-point of its multiplication range. The multiplication factor generator 37 thus provides a multiplication value for the digital-to-analog convertor 29 which is inversely proportional to the reflectance of the illuminated area 13. If the reflectance within the illuminated area 13 changes, the comparative output value of the AC filters 25 and 31 will change since the amount of light from the illuminaire 11, which is reflected for illumination of the down-looking sensor 23 varies accordingly. Thus, the multiplying digital-to-analog convertor 29 applies a multiplication factor to the down-looking sensor 23 signal which corrects the output of the down-looking sensor 23 for changes in room reflectance.

Changes in ambient light level, on the other hand, do not produce larger or smaller AC signals and thus the signals applied to the summer 27 do not change as the natural illumination level is altered. The AC filters 25 and 31, therefore, remove a known component from the outputs of the sensors 19 and 23, the AC component relating to the illumination generated by the illuminaire 11, to directly measure reflectance.

It should be understood that the output signal from the multiplying digital-to-analog convertor 29, prior to application to the AC filter 31, includes both the AC and DC output components from the down-looking sensor 23 corrected by the reflectance value in the multiplying digital-to-analog convertor 29. This value corresponds, in effect, to the value which would be measured if a light sensor were placed on the work table 17 directed upward toward the illuminaire 11, that is, the actual available light incident in the illuminated area. This signal is supplied to the negative input of a comparator 24 for comparison with a signal generated by a light level setting circuit 26, which is connected to the positive input of the comparator 24. It will be understood that the output of the light level setting circuit 26 provides a reference signal for the comparator 24, such that, if the magnitude of the signal from the multiplying digital-to-analog convertor 29 is less than that of the light level setting circuit 26, the difference between the two will appear as a positive value on the output of the comparator 24. Conversely, if the output of the multiplying digital-to-analog convertor 29 is greater in magnitude than that of the light level setting circuit 26, the output of the comparator 24 will be negative in value.

From this description, it can be seen that changes in the multiplication factor within the digital-to-analog convertor 29 will vary the output of the comparator 24, as will changes in the actual illumination level in the illuminated area measured by the down-looking sensor 23. The output of the comparator 24 provides a brightness control signal which is supplied to the input of a comparator 28.

A zero crossing detector 30 monitors the incoming AC power cycle used for the illumination source 11. The detector 30 generates a pulse each time this AC power signal crosses zero. The AC power waveform is in phase with a signal shown graphically at 210 in FIG. 4, and each zero crossing of this signal initiates a ramp waveform from a ramp generator 32, shown graphically at 222 in FIG. 4. The comparator 28 compares this ramp signal 222 with the brightness control signal generated by the comparator 24, and produces a positive or negative output signal, depending upon the polarity of this comparison. Thus, a square wave will be generated by the comparator 28, shown graphically at 226 in FIG. 4.

If the brightness control signal from the comparator 24 is greater than the ramp signal 222, the output of the comparator 28 will be at a positive voltage level. Once the ramp waveform 222 crosses the level of the control signal 224 during each half cycle of the AC applied power signal, the output of the comparator 28 will drop to zero volts.

The output brightness control signal from the comparator 24 additionally appears at the input of an inhibit signal generator 34 where it is compared with a constant value, which is equivalent to the signal magnitude required to cause the illumination source to perform at 30 percent of its maximum output rating. The inhibit signal generator 34 determines whether the magnitude of the brightness control signal 24 is less than this constant magnitude and generates an inhibit signal at its output, if the lamp is required to operate at less than 30 percent of its maximum rating.

The output of the comparator 28 and the inhibit signal generator 34 provide the inputs to a NOR gate 36. The signal from the comparator 28 is allowed to pass through this NOR gate 36 unless an inhibit signal has been generated by the generator 34, in which case the output of the NOR gate 36 remains at zero value, causing the controlled light source to be turned off.

An energization light sustain circuit 38 is connected to the main light switch or breaker switch which is used to control the lights within the illuminated area. This circuit 38 operates such that when the lights are energized by that switch, the circuit 38 forces the light source to remain in the on state for a period of time long enough to allow the multiplication factor generator 37 to adjust to any changes in room reflectance which have occurred since the lighting system was last turned off. The output of light sustain circuit 38 appears as one input to a NOR gate 40, the other input being provided by the output of the NOR gate 36. The output of the NOR gate 40 will correspond to the output of the NOR gate 36 at all times except when a sustain signal is generated by the circuit 38, at which time the output of the NOR gate will correspond to the output of the sustain circuit 38.

Figure 4:
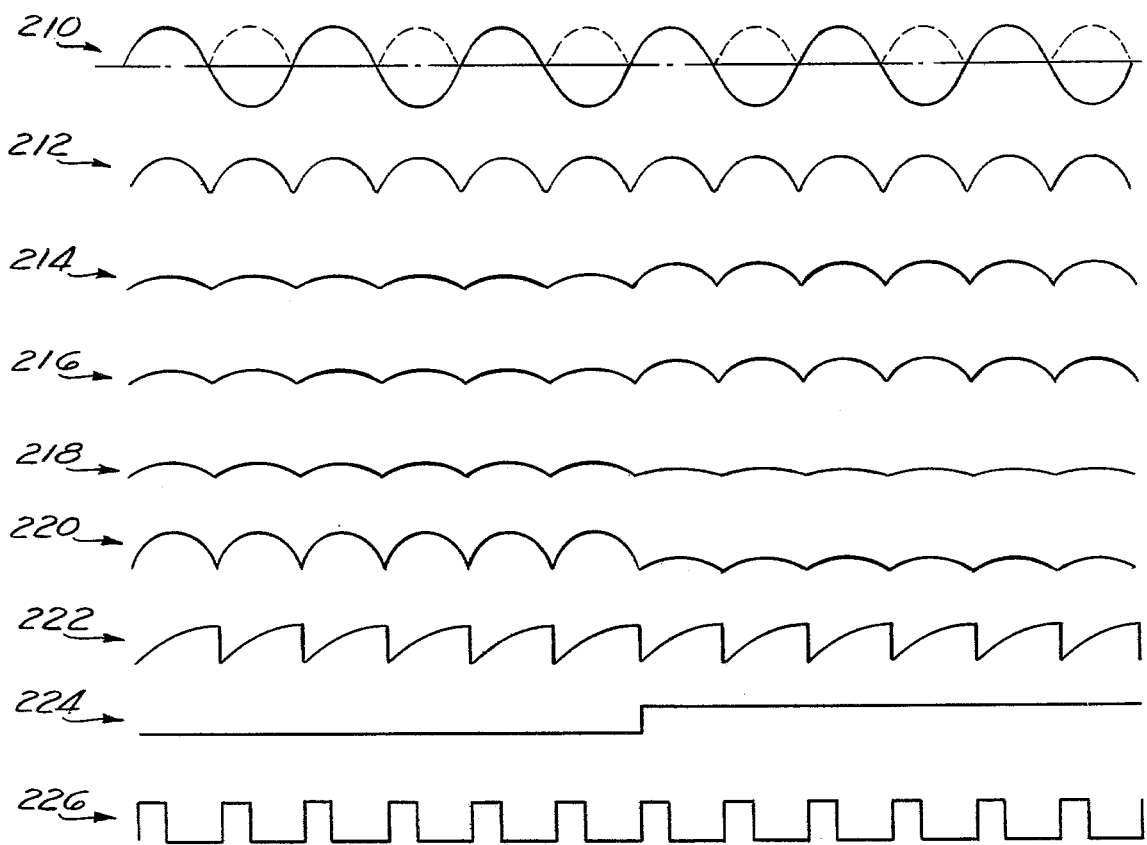
FIG. 4 is a diagram showing the various wave forms occurring at specific locations in the incident illumination responsive light control of FIG. 3.

The output of the NOR gate 40 provides the input of a triggering and driving circuit 42 which is responsive to the incoming square wave signal 226 of FIG. 4, and controls the light source to generate controlled illumination in response to the duty cycle of that signal.

System clocking is controlled by a clock pulse generator 44 which is responsive to pulse signals from the zero crossing detector 30 to generate system clock signals. In addition, the clock pulse generator 44 is responsive to signals from the inhibit signal generator 34 and does not produce output clock signals when the lighting system is inhibited by the generator 34.

A system power supply 46 provides the power used for the circuits within the illumination control device, and is a common prior art element, known and used by those skilled in the art.

From this general description, it can be seen that the multiplication factor within the digital-to-analog convertor 29 is set by comparing the AC outputs of the up-looking sensor 19 and down-looking sensor 23 so that it monitors the reflectance of the illuminated area and provides a multiplication factor which is inversely proportional thereto. This multiplication factor is applied to both the AC and DC components of the output signal from the down-looking sensor 23 to provide, at the comparator 24, a signal which, although derived from a sensor 23 located at the lamp 11, actually corresponds to the incident illumination in the work area. This signal is compared with a light level setting circuit 26 output to provide a brightness control signal. This signal is used to control the illumination of the artificial light source.

A more detailed description of the operation of the present invention will now be provided in reference to the schematic circuit diagram of FIG. 3 in conjunction with FIGS. 2 and 4.

Pulsating light from the controlled AC light source is measured by the up-looking sensor 19 of FIG. 2, which is the photodiode 110 of FIG. 3. A resistor 112 is connected between a voltage source in the power supply 46 and the photodiode 110 to bias the photodiode 110 for conduction. The conduction signal from the photodiode 110 provides an input signal for an amplifier 120, this signal being filtered to remove the DC component therfrom by a capacitor 114 which provides the function of the AC filter 25 of FIG. 2. A resistor 116, connected in parallel with the capacitor 118, serves to filter and tune the amplifier 120. Thus, an amplified signal corresponding to the pulsating portion of illumination sensed at the photodiode 110 is provided at the output of the amplifier 120. This signal is connected through a capacitor 122 and a summing resistor 124 to a summing node 126. This signal appearing at the junction 126 is graphically represented at 212 of FIG. 4.

The down-looking sensor 23 of FIG. 2 comprises the photodiode 128 of FIG. 3. This photodiode 128 measures both the AC and DC components of light in the illuminated area, including the reflected component of natural light as well as controlled artificial light in the area. The photodiode 128 does not detect direct light from the controlled artificial light source, since the sensor 23 is positioned to look away from that light source.

A resistor 130 connected to a negative voltage from the power supply 46 biases the photodiode 128 for controlled conduction. A capacitor 132 connected to ground filters the power supplied to the photodiode 128. The signal from the photodiode 128 is amplified in an amplifier 134 which is DC coupled and which includes feedback through a resistor 136 and capacitor 138. The output of the amplifier 134 is shown graphically at 214 of FIG. 4, including a pulsating AC component superimposed upon a DC level.

A pair of up/down counters 142 and 144 provide an 8-bit multiplication factor which is developed in response to the difference between the magnitude of the pulsating light as measured by the photodiodes 110 and 128 in a manner which will be described hereafter. The multiplying digital-to-analog convertor 29 multiplies the magnitude of the output signal from the amplifier 134, as provided through a resistor 140, by the 8-bit digital factor provided by the up/down counters 142 and 144, as the output of the convertor 29, shown graphically as 216 in FIG. 4. This signal is hereafter referred to as the "corrected down waveform."

The voltage which appears across a resistor 148 is an analog voltage proportional to the total illumination within the illuminated area, corrected for the reflectance of the illuminated area. This signal is AC filtered by a capacitor 150 and coupled by a resistor 152 to provide, at the junction 126, the AC component of the corrected down waveform. The resistors 124 and 152 provide the summer 27 of FIG. 2 such that, at the junction 126, the circuit provides a signal corresponding to the difference between the AC portion of the corrected down waveform and the AC portion of the amplified waveform from the up-looking sensor 110.

This difference value at the junction 126 is supplied as an input of an amplifier 154 where it is multiplied by a constant (k) scaling it for additional processing in the system. The amplifier 154 provides the multiplication function of the multiplier 33 of FIG. 2, such that the output signal from the amplifier 154 equals k (up-corrected down). The resistor 156 provides a feedback function for the amplifier 154. The output of this amplifier 154 is graphically depicted at 218 in FIG. 4.

An analog multiplier 158, which provides the correlation function of the multiplier 35 of FIG. 2, multiplies the output waveform from the amplifier 154 by the analog output waveform from the amplifier 120, that is, the amplified output of the up-looking photodiode 110. The resulting voltage level is compared with a null voltage level in an amplifier 164, by connecting this voltage level through a resistor 160 to one input of the amplifier 164. The other input of this amplifier 164 is connected to ground and the inputs are connected to one another by an integrating capacitor 162. The capacitor 162 provides an averaging function which permits the average output from the multiplier 158 to be compared with a null value.

If the up-looking value from the photodiode 110, as amplified by the amplifier 120, is more positive than the corrected down waveform, a positive voltage will appear at the output of the amplifier 164 and, upon receipt of a clock signal, a flip-flop 166 will be set to provide a positive output signal level from the flip-flop 166. Conversely, if the magnitude of the up-looking photodiode 110, as amplified by the amplifier 120, is less than that of the corrected down waveform, the amplifier 164 will produce a negative output causing a negative value to appear at the output of the flip-flop 166 on receipt of the next clock signal.

Each time the flip-flop 166 is clocked, the output of the flip-flop 166 will adjust the up/down counters 142 and 144. A negative output on the flip-flop 166 will cause counters 142 and 144 to decrement, whereas a positive output from the flip-flop 166 will cause the counters 142 and 144 to increment. This incrementing and decrementing of the counters 142 and 144 adjust the multiplication factor utilized in the multiplying digital-to-analog convertor 29 toward that which will compensate for the effects of reflectance as measured by the down-looking photodiode 128. Thus, the multiplication factor within the digital-to-analog convertor 29 is adjusted toward the level which will make the signals graphically depicted at 218 and 220 of FIG. 4 a null.

The output of the multiplying digital-to-analog convertor 29, including both the AC and DC components of the photodiode 128, adjusted by the reflectance factor within the digital-to-analog convertor 29, provides the input for the comparator 24 of FIG. 2, which includes a resistor 170 and an amplifier 172 provided with feedback by a capacitor 174. The light level setting circuit 26 of FIG. 2 comprises a connection between the remaining input of the amplifier 172 and a potentiometer 182 connected between the positive and negative output voltage of the power supply 46, with the desired lighting level being physically set by choosing a position for the potentiometer 182. The resistors 176 and 180 are in series with the potentiometer 182 and scale the adjustment value.

The inhibit signal from the inhibit signal generator 34 of FIG. 2 is also supplied to the potentiometer 182.

The amplifier 172 compares the signal level at the potentiometer 182, as connected through a resistor 184, with the output of the convertor 29, as connected through the resistor 170, and provides a brightness control signal at its output which is graphically depicted at 224 of FIG. 4. The amplifier 172 provides the comparison function of the comparator 24 of FIG. 2.

The AC power source, which supplies current to the artificial lighting system, is connected through a resistor 188 to the zero crossing detector 30. A representation of the AC power signal is shown graphically at 210 in FIG. 3. The resulting illumination level within the illuminated area would appear graphically as the positive portion of this waveform and the dotted line positive portions of 210 in FIG. 4, superimposed upon a DC level equivalent to the level of natural illumination within the illuminated area.

The zero crossing detector 186 generates a voltage pulse each time that the waveform 210 passes through a zero value. This pulse output from the zero crossing detector 30 initiates the generation of a ramp by the ramp waveform generator 32 of FIG. 2 which includes, in FIG. 3, a capacitor 198 charged by a transistor 188 which is biased for conduction by associated resistors 190, 192, 194, and 196. The output of this ramp generator is shown graphically at 222 of FIG. 4.

The comparator 28 is an amplifier which is connected to this ramp signal and the output of the amplifier 172, which values are compared to provide, at the output of the amplifier 28, a zero voltage level when the magnitude of the ramp signal is greater than the output of the amplifier 172, the brightness control signal, and a positive voltage when the control signal magnitude is greater than that of the ramp generator. The output of the comparator 28 is depicted graphically at 226 of FIG. 3.

The inhibit signal generator 34 of FIG. 2 corresponds to a comparator amplifier 252 and associated resistors 254, 256, 258, and 260 and capacitor 262, which provide a biased comparison input to the amplifier 252. The particular voltage level representing the level at which it is desirable to completely turn off the controlled light is set by selection of the values of resistors 258 and 260. When the voltage magnitude produced at the output of the amplifier 172 is less than this minimum voltage level, the otherwise positive output of the comparitor amplifier 252 goes negative, creating an inhibit signal. This inhibit signal appears at the input to the NOR gate 36 precluding any existing signal produced by the amplifier 28 from driving the triggering and driving circuit 42 of FIG. 2. This causes the controlled lights to be extinguished. This inhibit signal additionally appears at the input to the light level set 26 of FIG. 2 by connection through the resistor 178 of FIG. 3, and appears on the b input to a flip-flop 266 with resulting inhibition of all system clocking signals.

The energization light sustain circuit 38 of FIG. 2 comprises a resistor 268, capacitor 270, and isolation diode 272. This combination of elements is connected to the input of NOR 40 and is responsive to the physical energization of the lighting circuit by means of turning on a switch. When the lighting system is initially energized, after having been turned off for a period of time, the positive voltage applied to the capacitor 270 by the power supply 46 is initially coupled through this capacitor to provide a signal at the NOR gate 40 which overrides any other signal entering this gate, causing the NOR gate 40 to generate a sustained signal which drives the triggering and driving circuit 42 of FIG. 2 to maintain the controlled lighting in an On state until the capacitor 270 discharges. This sustained lighting at initial energization allows the control system of the present invention to readjust the up/down counters 142 and 144 in response to any changes in room reflectance which have occurred in the Off state of the lighting system.

The triggering and driving circuit of FIG. 2 is comprised of a pair of transistors 282 and 286 connected to drive the trigger input of a triac 296 which is, in turn, connected in parallel with a resistor 298 and a capacitor 300 for driving the lights controlled by this system. The transistor 282 is connected to the output of the NOR gate 40 through a parallel combination of a capacitor 274 and resistor 276 and is biased by a diode 278 and resistor 280. The transistor 286 is biased by a resistor 284 and has its collector coupled to the positive voltage source from the power supply 46 through a resistor 290 and resistor 288. The junction of the resistors 288 and 290 is coupled to ground by a filter capacitor 292.

The clock pulse generator 44 is connected to the output of zero crossing detector 30 and is responsive to signals from that device to generate a clocking pulse which is, in turn, placed on one input of a NOR gate 304. In addition, the clocking pulse generator 44 drives the clocking input of the flip-flop 266 which also has an input from the inhibit generator 34, that is, the amplifier 252. If an inhibit signal is present on the input of the flip-flop 266 upon reception of a clock signal from the clocking generator 302, the NOR gate 304 will effectively remove system clocking during the inhibit state of operation. The output of the NOR gate 304 comprises a Not clock signal which is additionally input to a NOR gate 306 to produce the clock signal.

In light of the above discussion, it is apparent that the present device provides a significant improvement over the prior art systems in the art of measuring and providing the desired amount of incident light for a given area. This device provides a means for detecting and compensating for the effects of reflectance at any given time within the illuminated area. It provides for accurate maintenance of total area illumination at desired levels with reflectance correction and therefore optimizes the energy requirement necessary for maintaining required lighting levels.

What is claimed is:

1. An illumination level control system for controlling the output of a light source in response to measurements of natural light, artificial light, and surface reflections in a given area, comprising:

first sensing means for determining the level of artificial light produced at a given source;

second sensing means for determining levels of natural light and artificial light reflected from said given area;

means connected to the output of said second light sensing means for scaling the level of said output;

means responsive to the output of said first sensing means and that portion of the output of said scaling means representing light reflected from said given source for producing a signal which is proportional to the difference between said outputs;

means responsive to said proportional signal and connected to said scaling means for changing the scaling factor of said scaling means in proportion to the value of said proportional signal;

means for providing a reference signal representing a predetermined desired light level;

means responsive to said reference signal and the output of said scaling means for producing a control signal representing the combined values of said reference signal and said scaled output signal; and means responsive to said control signal and connected to an illumination source for controlling said illumination source to produce light at a level proportional to the value of said control signal.

2. An illumination level control system as defined in claim 1 additionally comprising:

means responsive to said control signal for comparing the magnitude of said control signal against the magnitude of a threshold value representing a minimum magnitude for light operation;

means responsive to the output of said comparing means for generating an inhibit signal when said control signal magnitude is less than said threshold value; and means responsive to said inhibit signal and connected to said illumination source controlling means for preventing the operation of said illumination source while said inhibit signal is present.

3. An illumination level control system as defined in claim 1 additionally comprising:

means responsive to an energization signal for generating a light sustain signal;

means connected to said sustain signal generating means for maintaining said light sustain signal for a predetermined period; and means responsive to said sustain signal and connected to said illumination source controlling means for causing said illumination source to produce light throughout the period during which said sustain signal is maintained.

4. An illumination level control system as defined in claim 1 wherein said means for controlling said illumination source comprises:

means responsive to an alternating current signal for detecting each crossing of a given point by said signal;

means responsive to said detecting means for generating a ramp waveform in response to said detected signal crossings;

means connected to said ramp waveform generating means and to said control signal for comparing the magnitudes of said signals and generating an output indicating which signal is larger; and means responsive to said comparing means output signal for triggering and driving said illumination source, and regulating the brightness of said source in proportion to the duration of the comparison means signal.

5. An illumination level control system as defined in claim 4 wherein said triggering and driving means causes said illumination source to produce light when the magnitude of said ramp waveform generator signal equals or exceeds the magnitude of said control signal.

6. An illumination level control system for regulating the output of illumination sources within a given area comprising:
means for measuring light source intensity in a given area;
means for detecting the intensity of reflected light from said light source within said given area;
means responsive to said light source intensity measuring means and said reflected light detecting means for generating a difference signal representing light intensity minus reflected light intensity within said given area;
means for storing a value representing a desired total light level for the said given area;
means for measuring the intensity of all light reflected from said given area to produce a light level signal;
means responsive to said difference signal for modifying said light level signal to produce a modified light level signal;
means for comparing said modified light level signal with said desired light intensity value and generating a control signal; and
means responsive to said control signal and connected to control the intensity of illumination in said given area in proportion to said control signal.

7. An illumination level control system as defined in claim 6 wherein said means responsive to said control signal comprises:
means for periodically generating a ramp waveform;
means for comparing said ramp waveform magnitude with the magnitude of said control signal, and for generating an output signal indicating which magnitude is greater; and
a triggering and driving circuit responsive to said comparing means output signal for driving said illumination source.

8. An illumination control device comprising:
a pulsating illumination source;
first sensing means for measuring the magnitude of light emitted from said illumination source;
second sensing means measuring the intensity of light reflected from said given area;
means responsive to said second sensing means for identifying that portion of the total reflected light measured by said second sensing means which originated at said pulsating illumination source; and
means responsive to said first sensing means, said second sensing means, and to said identifying means for generating a signal for controlling the output of said illumination source.

9. An illumination control device as defined in claim 8 wherein said controlling means maintains a constant incident light level in said given area.

10. A device for producing a signal representing the intensity of light present in a measured area comprising:
first sensing means for measuring the output intensity of an illumination source;
second sensing means for measuring total light present within said measured area;
means responsive to said second sensing means for scaling the output of said second sensing means in proportion to a multiplication factor;
means responsive to the output of said scaling means and the output of said first sensing means for determining the difference between the magnitudes thereof;
means responsive to said determining means for generating a scaled signal representative of said magnitude difference; and
means responsive to said scaled signal representative of said magnitude difference and connected to said scaling means for generating a scaling factor to be used in said scaling means.

11. A device as defined in claim 10 wherein the output of said scaling means is a signal proportional to the total illumination in said measured area corrected for reflectance.

12. An illumination level control device for adjusting the output intensity of a light source to provide a predetermined incident light level in an area being illuminated, regardless of changes in the reflectance of said area, comprising:
a light source;
first sensing means mounted adjacent said light source for measuring the output intensity of said light source;
second sensing means mounted adjacent said light source for determining the intensity of light reflected from said illuminated area;
means responsive to said first and second sensing means for determining the reflectance of said illuminated area; and
means responsive to said reflectance determining means and said second sensing means for controlling the output illumination of said light source.

13. A device as defined in claim 12 wherein said means for controlling the output illumination of said light source comprises:
means for storing a value representing a desired light intensity within the measured area;
means responsive to said reflectance determining means for modifying the output of said second sensing means to produce a modified second sensing means signal; and
means for comparing said modified second sensing means signal with said value representing a desired light intensity to control said output illumination of said light source.

14. A method of controlling total illumination within an area, which is illuminated by a controlled light source, to a given incident light intensity, comprising the steps of:
determining the intensity of light produced by an illumination source;
measuring the total intensity of illumination within a given area, consisting of reflected light from said illumination source, as well as other sources;
selecting that portion of the measured total light present within said measured area which comprises reflected light from said illumination source;
comparing the intensity of said illumination source with the selected portion of the measured total light representing the intensity of reflected light from said illumination source to determine area reflectance;
scaling the measured total intensity of illumination by said area reflectance to provide a signal representing the total incident light intensity at the measured area; and
controlling said light source in response to said incident light intensity signal.

* * * * *